United States Patent [19]

McCormick et al.

[11] 4,085,490
[45] Apr. 25, 1978

[54] METHOD OF MAKING A ROLLED METAL PISTON RING

[75] Inventors: Harold E. McCormick, Ballwin; Herbert F. Prasse, Town and Country; William F. Ott; Donald J. Mayhew, both of St. Louis, all of Mo.

[73] Assignee: Ramsey Corporation, St. Louis, Mo.

[21] Appl. No.: 672,751

[22] Filed: Apr. 1, 1976

[51] Int. Cl.$^2$ .................. B23P 15/06; B21D 53/84
[52] U.S. Cl. ..................... 29/156.6; 29/DIG. 32; 277/138; 277/140; 72/177; 72/181; 72/234
[58] Field of Search ............. 29/156.6, DIG. 32; 277/138, 139, 140, 141; 72/177, 181, 234

[56] References Cited

U.S. PATENT DOCUMENTS

| 1,410,785 | 3/1922 | Vincent | 72/181 |
|---|---|---|---|
| 1,800,023 | 4/1931 | Kozicz | 72/181 |
| 1,859,057 | 5/1932 | Six | 29/156.6 |
| 1,902,841 | 3/1933 | Easter | 72/181 |
| 2,022,154 | 11/1935 | Rothweiler | 29/156.6 |
| 2,317,580 | 4/1943 | Bauer | 277/141 |
| 2,768,038 | 10/1956 | Cable | 277/140 |
| 3,378,268 | 4/1968 | Anderson | 277/143 |
| 3,808,863 | 5/1974 | Marcovitch | 72/177 |
| 3,977,264 | 8/1976 | Sproul | 29/159 R |

FOREIGN PATENT DOCUMENTS

| 65,599 | 7/1895 | Germany | 72/181 |
|---|---|---|---|
| 731,442 | 2/1943 | Germany | 72/181 |

OTHER PUBLICATIONS

McCormick, H. E., et al., "New Developments in Piston Rings for the Modern Diesel Engine," from Society of Automotive Engineers Paper No. 750769, Sept. 8-11, 1975.

*Primary Examiner*—Lowell A. Larson
*Assistant Examiner*—Daniel C. Crane

[57] ABSTRACT

A rolled steel oil control piston ring for internal combustion engines is of generally U-shaped cross section with a pair of opposed rigid sidewalls projecting inwardly of the ring from a central peripheral wall thereof. A pair of flat-faced solid scraper rims formed by closed pleats rolled from the peripheral wall extend outwardly of the ring. The ring is made by rolling flat strip steel stock through a series of profiled rollers by guiding the edges of the stock without deforming the same, while taking up dimensional variations of the stock by displacement of the central portion of the strip. Pleats are formed in the central portion by the profiled rollers and the pleats are closed on themselves to provide the solid scraper rims. An extrusion-like profile-reducing rolling step provides dimensional accuracy to the finished strip which is then punched to provide the vent openings in the peripheral wall, and coiled and cut to form individual piston rings.

17 Claims, 22 Drawing Figures

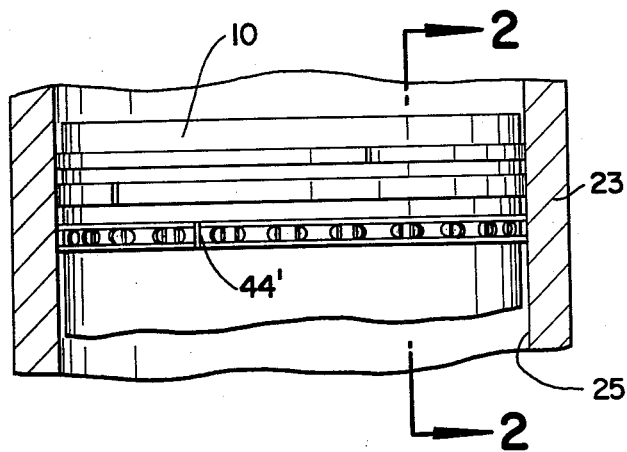
FIG. 1
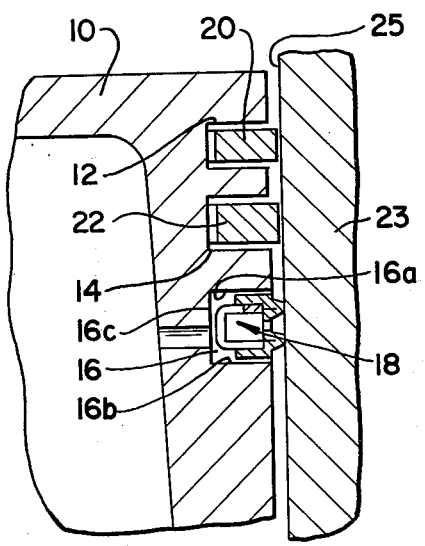
FIG. 2
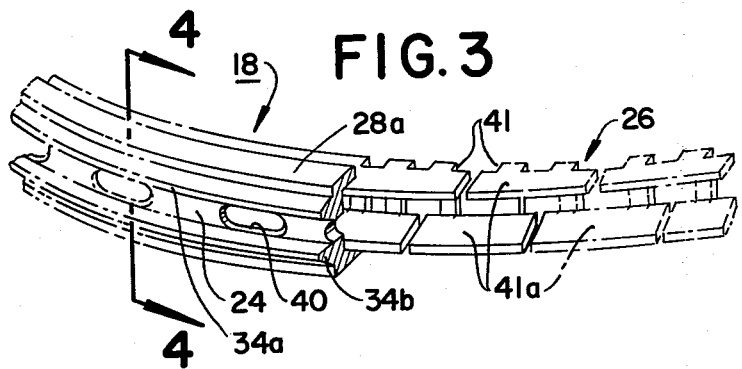
FIG. 3
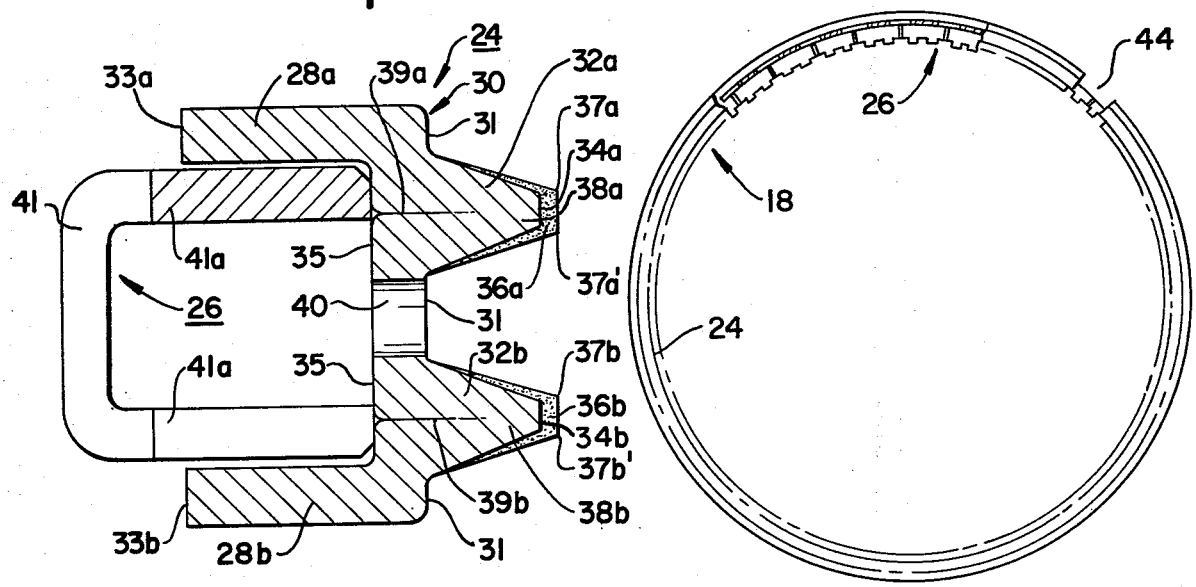
FIG. 4
FIG. 5

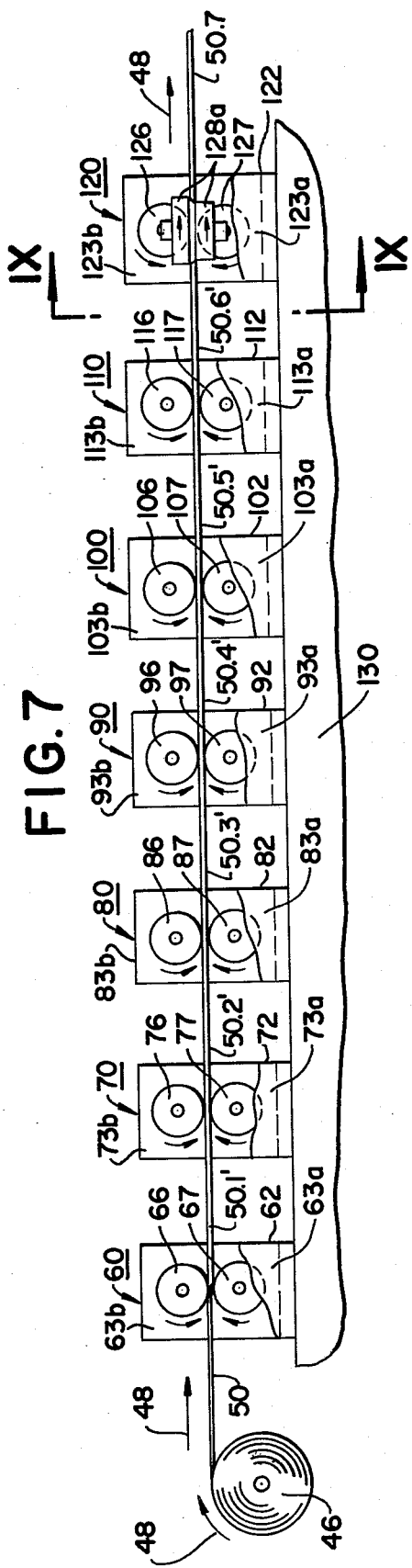
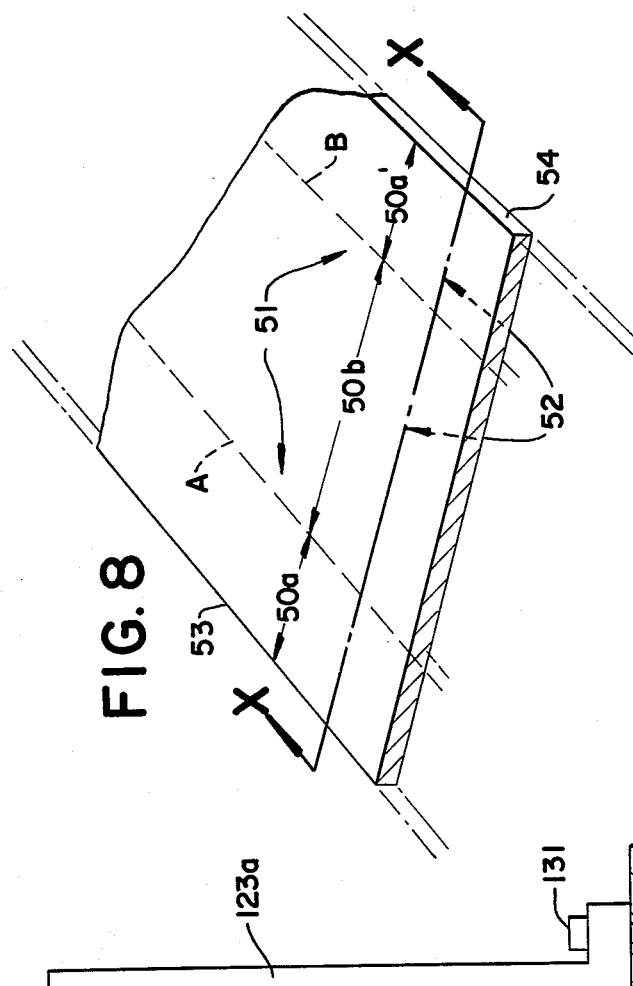
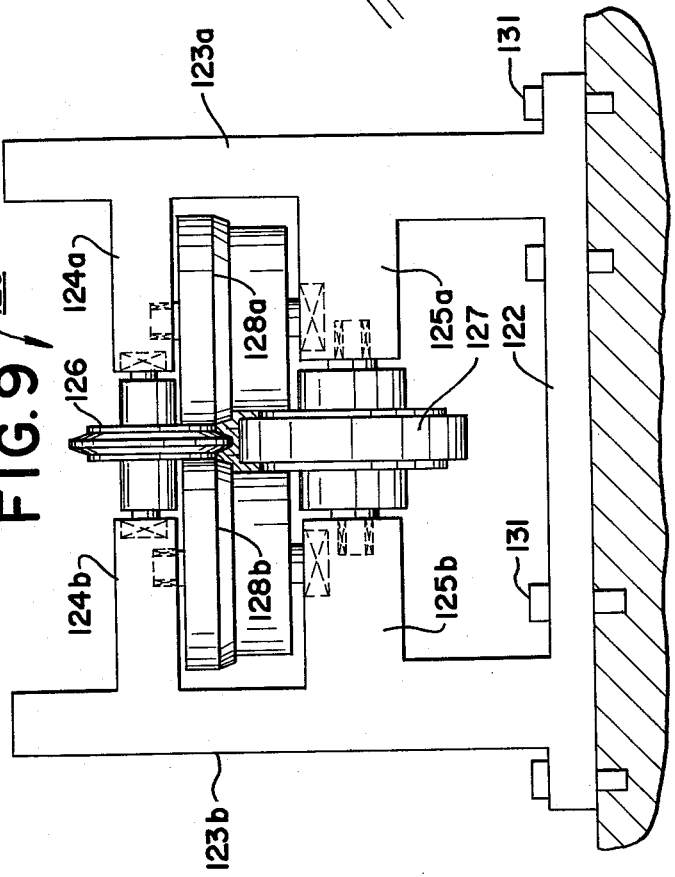

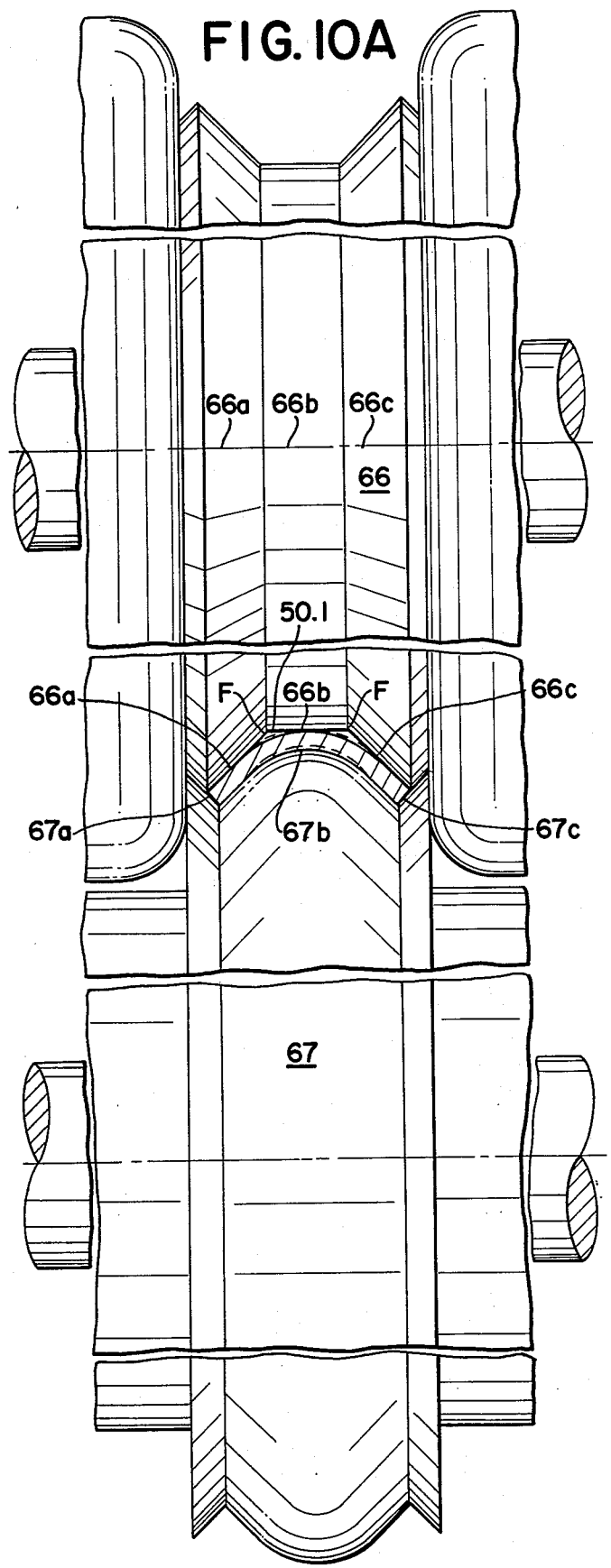
FIG. 10A
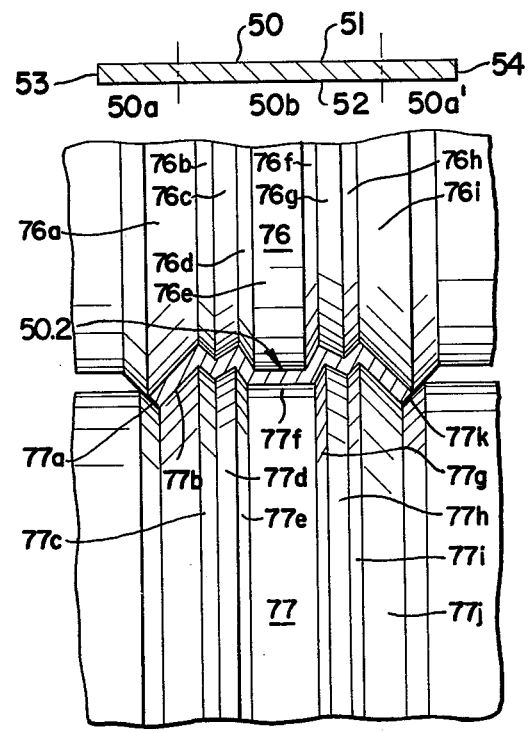
FIG. 10
FIG. 10B
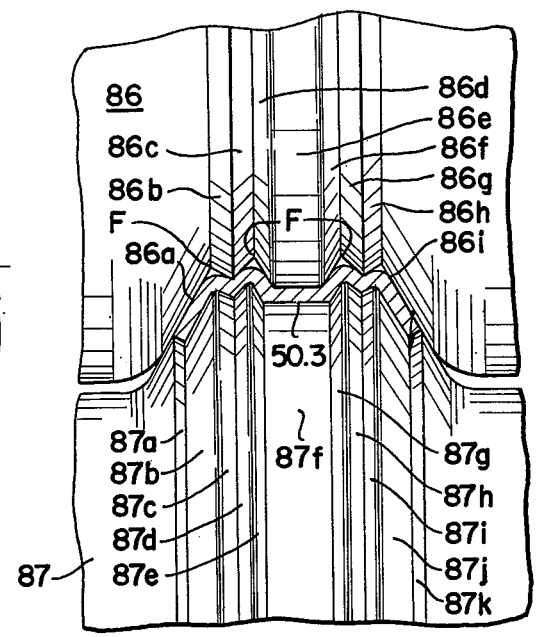
FIG. 10C

METHOD OF MAKING A ROLLED METAL PISTON RING

RELATED APPLICATION

This application is related to my co-pending application, Ser. No. 672,752, filed Apr. 1, 1976.

BACKGROUND OF THE INVENTION

The present invention is concerned with making piston rings for internal combustion engines, and particularly with oil control rings and a method of making the same. More specifically, the present invention is concerned with a rolled steel oil control piston ring for internal combustion engines, i.e., with a method of making such rolled steel rings. However, the invention is not limited thereto, and concerns piston rings in general, and a method of making them.

Oil control rings for reciprocating piston internal combustion engines comprise split, generally circular rings which may be U-shaped in cross section. The rings are adapted to be received in a circumferential groove formed in the piston, with the free ends of the legs of the U (the sidewalls of the ring) projecting inwardly of the ring towards the bottom of the groove, and the connecting central portion of the U (the peripheral wall of the ring) facing outwardly of the groove, towards the cylinder wall. The outwardly facing peripheral wall has scraper rims formed thereon and the ring is thrust outwardly by an expander spring so that the rims engage the cylinder walls. The expander spring usually is disposed in the piston groove between the piston ring and the bottom of the groove, and engages the inside of the piston ring to force it outwardly.

Such oil control rings having a pair of flat-faced scraper rims to engage the cylinder walls, also have vents between the rims of the ring to admit the passage of debris therethrough, as understood by those skilled in the art.

For example, U.S. Pat. No. 3,378,268 assigned to the assignee of the present application, shows in FIG. 1 thereof an oil control ring assembly comprising a one-piece cast iron ring and an expander spring engaged therewith. The expander spring is between the bottom of the piston groove and the oil control ring and serves to expand the ring outwardly into contact with the cylinder wall of the engine. The cast-iron ring has rims formed in the peripheral wall thereof. The rims have flat scraping faces which contact the cylinder wall. The desired configuration of the ring is obtained by providing a casting of suitable shape which is thereafter machined to finished dimensions. Generally, castings are employed in the piston ring field, although it is conceivable that a ring of the desired configuration may be manufactured by a forging operation.

However, the use of cast iron oil control rings has some disadvantageous limitations. The degree of hardness which can be attained in a cast iron ring is limited by the ability to economically machine high hardness parts. If heat treatment to harden previously machined parts is used, part distortion of the small section rings is a problem. Further, cast iron rings are somewhat prone to damage upon installation within the groove of a piston. In addition, the expander spring normally employed in conjunction with the oil control ring is usually made of steel and, being harder than the cast iron ring, tends to wear those portions of the ring which it contacts to expand the ring.

The foregoing limitations can be avoided by forming the oil control ring from a hard metal such as steel. The manufacture of oil control rings by rolling from metal strip stock is also suggested in U.S. Pat. No. 3,378,268. For example, in FIGS. 5 to 7, a rolled oil ring formed from strip metal is shown. It will be appreciated that rolling the ring to proper profile from strip metal and thereafter coiling and cutting rings from the coiled, profiled strip is an efficient and much less expensive method of manufacture than the use of machined castings or of forgings.

However, certain difficulties are involved in rolling the desired profile from steel strip. One difficulty is that the required dimensional accuracy of the ring can not be easily maintained in the rolling operation. The tolerances required in the finished dimensions of piston rings and in particular of oil control rings are very small. For example, the flat face of the scraping rings must be very precisely aligned in flat scraping contact with the cylinder wall. This means that with the rings properly positioned in the groove, the flat faces of the rims must lie in a common plane which defines a cylinder closely conforming to the engine cylinder walls, to provide effective oil scraping thereof.

Obviously, much if not all of the cost and manufacturing advantage to be gained by rolling the profiled rings from steel strip will be lost if it is necessary to thereafter carry out a machining operation to assure satisfactorily close dimensional tolerances of the ring.

Further, prior methods of rolling the profiled ring from steel strips did not admit of providing the scraping rims with the desired flat face, but rather provided a rounded, sloping face to the rim as shown, for example, in FIGS. 5, 6 and 7 of the above mentioned U.S. Pat. No. 3,378,268.

The aforesaid patent also illustrates a prior art attempt to correct for large dimensional variations of rolled as opposed to machined cast rings. This attempt is to make the rolled ring from stock which is thin and flexible enough so that dimensional variations could be overcome by deformation of the rings against the cylinder wall surfaces by the expansion force of the expansion spring. (See FIG. 1 of 3,378,268.) Rings rolled from such relatively thin stock however, are inferior to rings of more rigid stock in terms of ring positional stability and oil scraping characteristics.

It is accordingly an object of the present invention to overcome these and other shortcomings of the prior art.

It is an object of the present invention to provide a method of making a rolled metal piston ring, and in particular a rolled metal oil control piston ring, which provides rings of closely controlled dimensional variations. It is another object of the invention to provide such a rolled ring which is of rigid construction, being made from relatively heavy stock to impart desired rigidity and improved scraping action to the ring, as compared to the structure of U.S. Pat. No. 3,378,268.

It is another object of the present invention to provide a method of rolling metal strip to produce from generally flat stock strip, such as a steel strip, a U-shaped cross section strip having scraper rims, preferably flat-faced rims, thereon and coiling and cutting the strip to form piston rings, and in particular, oil control piston rings therefrom.

In accordance with the present invention there is provided a piston ring comprising a rolled metal, preferably steel, ring of generally U-shaped cross section having at least one scraping rim formed in the peripheral wall thereof by a pleat folded from the wall and at least partially closed on itself. In a preferred embodiment, the rims are flat-faced. There are two such rims provided, and they extend circumferentially around the peripheral wall of the ring, which also contains vent holes in the ring, between the scraper rims. The U-shape cross section is provided by a centrally disposed peripheral wall from which opposed sidewalls project inwardly of the ring.

The method of the invention is carried out by introducing elongated metal strip of selected dimensions sequentially into a series of sets of profiled form rolls which define, between rolls of a set, metal work spaces. The strip may be considered to be comprised of a center portion bounded by two longitudinally extending edge portions. The metal, e.g., steel strip is passed sequentially into the series of the profiled rollers and through the metal work spaces defined therebetween. These serve to bend the strip into a transverse profiled cross section by confining both the edge portions of the strip by contacting them on both sides between opposed form rolls and deflecting both edge portions of the strip transversely about a longitudinal axis thereof to impart a generally U-shaped profile to the strip, while initially permitting displacement of the central portion of the strip within a freeboard space between form rolls provided for that purpose, in order to accomodate variations of the strip dimensions without cold-flow or other deformation of the edge portions. Additionally, the central portion is folded longitudinally to provide at least one (preferably, two) longitudinally extending pleats in the central portion of the strip. The pleats are at least partially closed on themselves to form layered rims projecting from the central portion of the strip.

After the initial forming of the U-shaped cross section profile, the strip is passed through an extruder-like work space between opposed roll forms in which it is subjected to sufficient pressure to impose an extrusion effect upon the metal by which the cross sectional area of the strip is reduced slightly to form the final cross sectional dimensions thereof.

In accordance with one aspect of the invention, the pleats are formed so that the finished rims have flat scraping faces.

The completed profiled strip is punched to form vent holes therein, and coiled into a helical coil to give a permanent coiled set to the strip. The coils may be severed to any desired coil length for storage or further processing. The scraper rims or the outer face of the ring including the scraper rims, may be provided with a wear resistant coating such as a chromium plated coating or a molybdenum coating. The coiled strip is then cut longitudinally so that a plurality of generally circular, gapped annular rings is formed therefrom.

Certain embodiments of the invention are now described with reference to the accompanying drawings which form a part hereof and wherein:

FIG. 1 is a partial view in elevation of the top of a piston of an internal combustion engine, the piston having circumferential grooves formed therein within which are disposed piston rings, including an oil control piston ring in accordance with this invention;

FIG. 2 is an enlarged sectional view taken along the line 2—2 of FIG. 1;

FIG. 3 is a partial perspective view of an assembly of an oil control ring in accordance with the present invention together with an expander spring;

FIG. 4 is an enlarged view in cross section taken along lines 4—4 of FIG. 3;

FIG. 5 is a plan view of the assembly of FIG. 3;

FIG. 7 is a schematic side view of roll form equipment employed to carry out the roll form step schematically illustrated in FIG. 6;

FIG. 8 is a perspective view of a portion of metal strip usuable to make a piston ring in accordance with the present invention;

FIG. 9 is an end view in elevation of one of the roll stands of the equipment shown in FIG. 7;

FIG. 10 is an end view in section of the metal strip of FIG. 8;

FIGS. 10A through 10G are partial end views in elevation showing the sequence of roll form steps of the invention.

Figure 13:
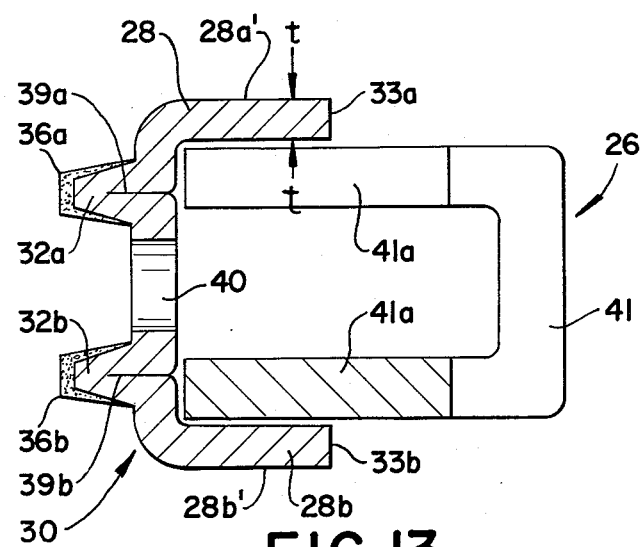
FIG. 13 is an enlarged section view along lines 13—13 of FIG. 11; and also shows an expander spring engaging the ring.
Figure 15:
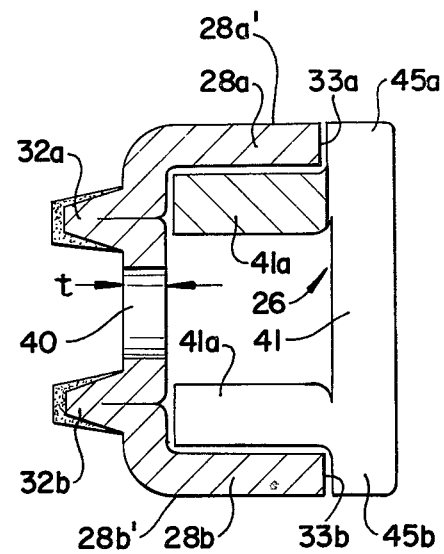

FIG. 15 corresponds to FIG. 13 but shows a different type of expander spring.

Referring to FIGS. 1 and 2, there is shown in partial view a piston 10 containing a plurality of ring grooves 12, 14 and 16 disposed circumferentially thereabout, ring groove 16 having disposed therein an oil control ring assembly 18 in accordance with the invention. Compression rings 20, 22 are respectively disposed in circumferential groove 12, 14. Piston 10 is disposed within the cylinder 23 of an internal combustion engine, cylinder 23 having a cylinder wall surface 25.

Referring now to FIGS. 3, 4 and 5, the piston ring of the invention is generally indicated at 24 assembled together with an expander spring 26. Oil control piston ring 24, as best seen with reference to FIGS. 3, 4 and 5 is of generally circular, split annular construction and has, in cross section (FIG. 4) generally a U-shape. A pair of opposed side walls 28a, 28b project inwardly of ring 24 (towards the center thereof) from, respectively, the uppermost and lowermost portions of peripheral wall 30.

A pair of scraping rims 32a, 32b project from peripheral or intermediate wall 30 outwardly of oil control ring 24. Scraping rims 32a, 32b are each seen to have, respectively, a flat scraping face 34a, 34b facing outwardly of the ring and extending circumferentially therearound. Both of the scraping rims 32a, 32b have hard wear coatings, 36a, 36b, respectively, deposited thereover. The hard wear coatings 36a, 36b increase the wear resistance of scraping faces 34a, 34b against cylinder wall 26 and may comprise any suitable hard facing material such as chromium or molybdenum, to name but two possibilities. The coatings may be applied by plating from an electrochemical bath, by plasma or spray gun plating or any other suitable means. Due to the mode of applying the coating 36a, 36b it usually extends beyond scraping faces 34a, 34b to other portions of peripheral wall 30. It will be understood that such hard facing materials are not always required.

Expander spring 26 engages oil control ring 24 from the inside thereof. As best seen in FIGS. 1 and 2, expander spring 26 is compressed somewhat between oil control piston ring 24 and the bottom wall 16c of circumferential oil control groove 16 (FIG. 2) so that in use, expansion spring 26 forces oil control piston ring 24 outwardly so that the flat faces of scraping rims 32a, 32b engage the cylinder wall 25 of engine cylinder 23 in scraping, sliding engagement therewith. Legs 28a, 28b may be fored with a very slight outward flare as they extend from wall 30. A slight outward flare may improve the seal with the upper and lower surfaces 16a, 16b, respectively, of the groove 16. An inward flare (legs 28a, 28b flared towards each other) is normally not desired.

As is best seen with reference to FIG. 4, oil control piston ring 4 is made from a single strip of metal, for example from flat, generally ribbon-shaped steel stock such as shown in FIG. 8. Preferably 1050 carbon steel stock is used and annealed to make it ductile. After carrying out the various roll forming and other steps described in more detail hereinbelow, the piston ring rolled, coiled and cut from a strip such as that shown in FIG. 8 has the form shown, for example in FIGS. 3–5. Side walls 28a, 28b are formed from the respective longitudinally extending edge portions of the strip and peripheral wall 30 is formed from the longitudinally extending center portion of the strip with scraping rims 32a, 32b being formed from pleats folded in the longitudinally extending center portion of the strip, all as explained in more detail below. As is best seen in FIG. 4 the pleats from which scraping rims 32a, 32b are formed are closed upon themselves to form generally rigid, solid, multi-layer rims 32a, 32b. By "multi-layer" it is meant that the total rim thickness (measured parallel to peripheral wall 30) is formed of effectively a double layer of the original strip thickness for at least a portion of the depth by which the rims 32a, 32b extend from the base 31 of peripheral wall 30. The distal end of scraping rims 32a, 32b, i.e., the ends remote from base 31 of the peripheral wall 30, comprise apex folded portions 38a, 38b and the remainder of scraping rims 32a, 32b contain abutting surfaces indicated 39a, 39b, which extend into and through peripheral wall 30. Surfaces 39a, 39b are in tight abutting contact with each other for almost the entire length thereof, i.e., for at least the major portion thereof.

A plurality of vent openings 40 are provided in oil control piston ring 24 between scraping rims 32a, 32b along the circumference of the ring (FIG. 1). Side walls 28a, 28b have respective edge faces 33a, 33b. Peripheral wall 30 has an inside surface 35.

Expander spring 26 comprises (FIG. 3) a perforated profiled spring of the garter spring, circumferentially expanding type which does not bottom on the bottom 16c of oil control circumferential ring groove 16. Expander spring 26 is composed of circumferentially spaced arcuate segments 41a disposed in two parallel extending rows with the segments of one row being staggered with relation to the segments of the other row. Each segment of one row is connected by one outstanding finger 41 to one segment of the other row and by its other finger 41 to an adjacent segment of the other row. The circumferentially outer edges of arcuate segments 41a engage the inside surface 35 of ring 24 and, in use, thereby press thereagainst and urge piston ring 24 into scraping contact with cylinder wall 25 (FIGS. 2 and 4). As best seen in FIG. 4 the uppermost and lowermost portions of segments 41a are beveled to aid in reducing wear on ring 24.

It will be understood that any other suitable type of expander spring may be employed such as garter type springs of different configuration than that illustrated, coil type expander springs, etc. For example, fingers 28 may have axially projecting portions which engage, respectively, edge faces 33a, 33b of ring 24. It will be further apparent to those skilled in the art that the gap 44 of ring and expander assembly 18 shown in FIG. 5 will, upon being compressed into position within groove 16, be reduced to a quite narrow slit 44' as seen in FIG. 1.

The flat-scraping faces 34a, 34b and their respective flat, hard wear coatings 36a, 36b thereover provides an oil scraping surface of excellent characteristics for scraping oil from the surface 26 of cylinder 24. The flat surface is a distinct advantage over prior rolled steel oil control rings which provided but a rounded contact surface against cylinder wall 26. The flat surfaces provide by virtue of its scraping edges 37a and 37a' and 37b and 37b' knife-like edges to scrap oil from the surface and move it ahead of the traveling piston ring.

Figure 6:
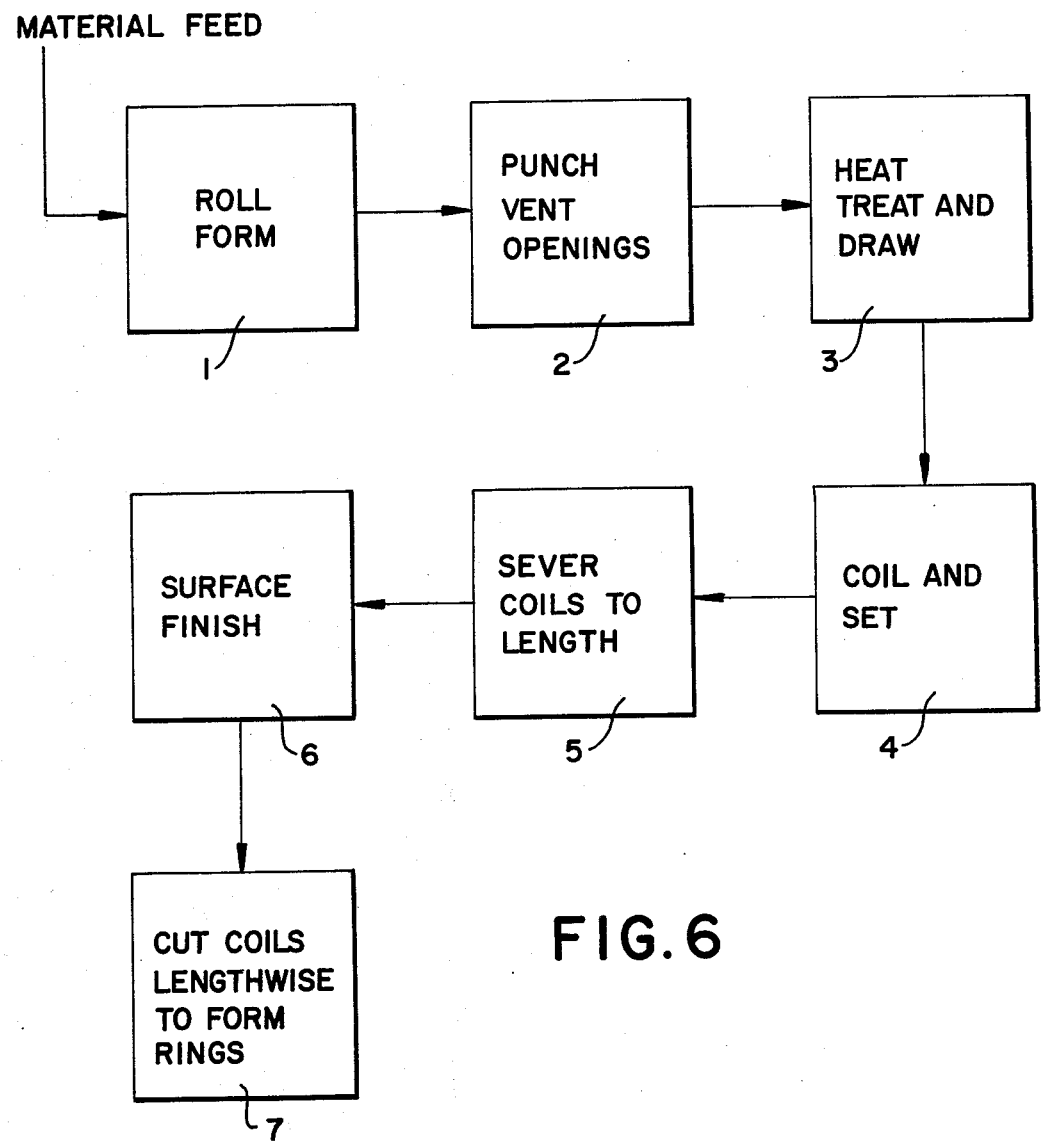
FIG. 6 is a schematic block flow diagram of a process of making piston rings in accordance with the present invention.

FIG. 6 shows a block flow diagram of a typical process for manufacturing piston rings in accordance with the invention. Metal strip 50 is fed to a roll form operation indicated by the block 1. The roll form operation may be one such as schematically shown in FIG. 7. During the roll form operation the metal strip is formed into the profiled strip having the scraper rims formed thereon from which the piston rings of the invention are made. After the roll form operation the profile strip is then sent to a punching or other suitable operation indicated by the block 2 in which suitable vent openings are punched in the strip. As indicated by the block 3 in FIG. 6, this may be followed by suitable heat treatment and drawing operation to harden the wire stock. This may be accomplished in the known manner by passing the wire through induction coil heaters, spray quenches and wire drawing apparatus. After the heat treatment operation exemplified by block 3, the profiled material is passed to a coiling operation in which a permanent set is applied to the wire to provide a permanently coiled stock material. This may be accomplished in any suitable manner, usually by coiling the wire about a mandrel and heat setting the wire to a permanent set on the mandrel. This is shown by the "coil and set" block indicated by the numeral 4 in FIG. 6. The coils are then severed to any convenient length of coil in the coil severing step indicated by block 5. With the coil severed to convenient coil lengths, they are then passed to a surface finishing operation. This may include any suitable step such as phosphate treating the coiled metal to impart a suitable surface thereto, and optionally applying a hard, wear resistant facing on the coil, at least to the peripheral wall or the scraping rims or scraping rim faces thereof. The wear resistant coating may be a chromium coating, a molybdenum or molybdenum alloy coating or any other suitable coating applied by any appropriate method such as electroplating, plasma or flame spraying, etc. The surface finishing step is generally indicated by block 6 in FIG. 6. After the surface finishing step is completed the cut coils are severed lengthwise, i.e., longitudinally with respect to the coil so that individual gapped rings are severed from the coil. This is illustrated in block 7 of FIG. 6. It will be appreciated that the particular sequence illustrated in FIG. 6 may be varied, for example at any suitable point thereof, stock may be withdrawn from the process and placed into storage and then reintroduced into the process later on.

Referring now to FIG. 7 there is shown in schematic view roll form equipment utilizable to produce the rolled metal piston ring of the invention. A coil 46 of metal strip 50 is unwound in the direction indicated by the arrows 48 of FIG. 7 to pass metal strip 50 through a series of roll stands 60, 70, 80, 90, 100, 110 and 120.

Referring to FIG. 8, there is shown a perspective broken-away view of a portion of metal strip 50 which is seen to be generally of a flat, ribbon-shape having a first major surface 51 and an oppositely-facing second major surface 52, the major surfaces being bounded by longitudinally extending edges 53, 54. Dotted lines A, B are superimposed on strip 50 in FIG. 8 to indicate edge portions 50a, and 50a' of strip 50 and central portion 50b. Edge portions 50a and 50a' are of equal width and indicate longitudinally extending segments of strip 50 adjacent to, repectively, edges 53 and 54. Central portion 50b indicates the longitudinally extending section which is intermediate end sections 50a and 50a'. It will be appreciated that the divisions of strip 50 into longitudinally extending end portions and a central portion is done for ease of description. Generally, side walls 28a, and 28b of oil control piston ring 24 are made from end sections 50a and 50a' and peripheral wall 30 (and scraping rims 32a and 32b folded therefrom) are made from central portion 50b. However, it is to be understood that the portions of strip 50 described as the "edge portions" do not necessarily have to coincide exactly with side walls 28a, 28b, since the edge portion confined between opposed form rolls in the initial stages of the roll form step may be somewhat more or somewhat less than the amount of strip 50 which is ultimately turned over to form side walls 28a, 28b.

A series of seven roll form stands are shown in FIG. 7, through which metal strip 50 is fed. In the embodiment illustrated, the first 6 roll form stands 60, 70, 80, 90, 100 and 110, each contain a set of two opposed vertical roll forms which are profiled to define a metal working space between them at the region of tangential confluence of the two rolls. The seventh and last roll form stand 120 contains opposed horizontal rollers as well as opposed vertical rollers, all of which sets of opposed horizontal and vertical rollers cooperate to form the metal work space at their point of confluence.

FIG. 9 shows an end view along view line IX—IX and is typical of the construction of the other roll form stands, except for the provision of horizontal, as well as the vertical, roll forms in roll form stand 120.

Referring to FIG. 9, roll form stand 120 comprises a roll form stand base 122 having a pair of opposed stanchions 123a and 123b from which protrude upper journal posts 124a, 124b and lower journal posts 125a, 125b. A vertical top roll 126 and a vertical bottom roll 127 are journaled, respectively, in journal posts 124a, 124b and 125a, 125b. Horizontal top rolls 128a, 128b are each journaled, respectively, in journal post 124a, 125a and 124b, 125b. The rollers are mounted by means of journal shafts (unnumbered) as shown. Roll form stand 120 is affixed to support base 130 by mounting bolts 131.

Roll form stands, 60, 70, 80, 90, 100 and 110 are generally similar to roll form stand 120, except that they carry only a pair of opposed vertical rolls and no horizontal rolls.

Accordingly, roll form 60 comprises a roll form support 62 which includes upright stanchions 63a and 63b. Vertical top roll 66 and vertical bottom roll 67 are journaled between stanchions 63a and 63b. Corresponding parts of the other roll forms are correspondingly numbered. The direction of rotation of the respective top and bottom rolls are indicated by the curved arrows associated therewith. In each case, the stanchion shown in the foreground of FIG. 7 (that carrying the "a" designator) is partially broken away to better show the top and bottom vertical rolls (vertical and horizontal rolls in the case of roll form support 120 only).

Referring first to FIG. 10, there is shown in section along line X—X of FIG. 8 the transverse cross section of strip 50 as it appears prior to entering roll form stand 60.

Metal strip 50, which is prefereably of steel, more preferably a steel such as 1050 or 1090 steel, is of generally flat, ribbon shape providing a wide, thin rectangular cross section having a first major surface 51 and a second major surface 52 and edges 53, 54.

Figure 10D:
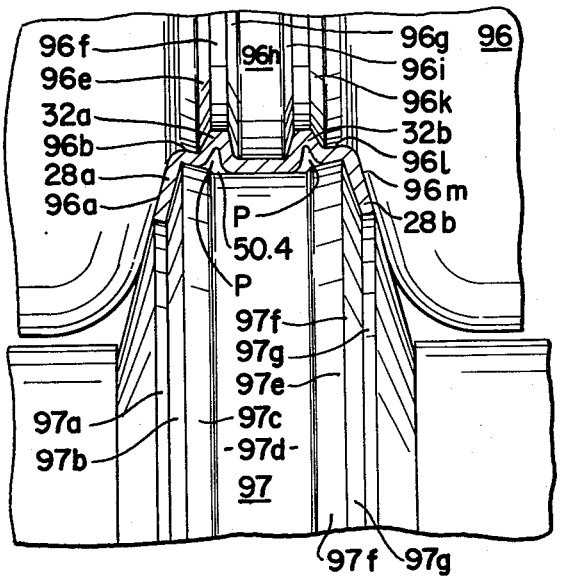

FIG. 10A through FIG. 10G show partial end views through roll form stands 60, 70, 80, 90, 100, 110 and 120 sequentially, to indicate the various rolling steps being carried out therein on strip 50. Upon entering the first roll form stand 60, those portions of strip 50 corresponding more or less to edge portions 50a, 50a', are confined between vertical top roll 66 and vertical bottom roll 67, more specifically in the working space 50.1 provided therebetween. Working space 50.1 is defined between surfaces 66a, 66b and 66c of top roll 66 and arcuate surface 67b and portions of surfaces 67a and 67c of bottom roll 67. Edges 53 and 54 of strip 50 (FIG. 10) engage that portion of surfaces 67a and 67c which lie adjacent to arcuate surface 67b of bottom roll 67 (FIG. 10A). It will be noted that edge portions 50a and 50a' of strip 50 are confined between, respectively, surfaces 66a and the left-hand segment (as viewed in FIG. 10A) of surface 67b whereas edge portion 50a' is confined between the right-hand portion of surface 66c (as viewed in FIG. 10A) and the right hand portion of arcuate surface 67b. The portions of major surfaces 1 and 2 lying within, respectively, edge portion 50a and 50a' are in rolling contact with the indicated portions of, respectively, top roll 66 and bottom roll 67.

In contrast, central portion 50b of strip 50 is positioned within metal working space 50.1 in a portion thereof which has a freeboard space F existing between the surfaces of metal strip 50 and the adjacent portions of surfaces 67b (the central segment thereof) and 66b and parts of 66a and 66c adjacent surface 66b. This freeboard space is important in allowing for deflection of metal strip 51, as indicated by the dotted lines in FIG. 10A upwardly or downwardly to accomodate variations which will occur in the dimensions of strip 51 without deforming the edge segment 50a, 50a' thereof. This limits cold flow metal deformation of strip 51 to the folding of pleats in central portion 50b thereof and avoids work hardening of the edge portions 50a, 50a', of strip 51. Strip 51 is seen to be bent in roll form 60 into a shallow U-shaped configuration (inverted in the embodiment of FIG. 10A). The metal strip employed in accordance with the invention is one which is capable of taking and holding a permanent set from the bending and any supplemental heat treatment imposed (per item 3 of FIG. 6). Upon emerging from metal work space 50.1 strip 50 has acquired the profile thereof, indicated by 50.1 in FIG. 10a.

It will be noted in FIG. 10A that each of edge portions 50a, 50a' which are confined in rolling contact on both their major first and second surfaces, respectively, portions of top roll 66 and bottom roll 67, each comprise approximately 1/6th of the total width of strip 50 between edges 53 and 54.

FIG. 10B shows strip 50 in the working space 50.2 contained between top roll 76 and bottom roll 77. Top roll 76 has in profile a "saw-tooth" configuration providing a series of surfaces 76a, 76b, 76c, 76d, 76e, 76f, 76g, 76h and 76i. Similarly, bottom roll 77 provides a saw-tooth configuration having surfaces 77a, 77b, 77c, 77d, 77e, 77f, 77g, 77h, 77i, 77j and 77k. The portion of strip 51 enclosed by surfaces 76a, 77a and 77b corresponds to that confined between the left-hand surface of 66a, 67a and 76b in FIG. 10A. Similarly, edge portion 50a' is defined in FIG. 10B between the area defined by surfaces 76i, 77k and 77j. Surfaces 76b and 76c and their complimentary surfaces 77c and 77d cooperate to begin the formation of a pleat in central portion 50b. A similar pleat is being commenced between surfaces 76f, 76g and their complimentary surfaces 77g and 77h. Upon emerging from roll stand 70, strip 50 has the configuration of work space 50.2 as indicated at 50.2 in FIG. 7.

FIG. 10C shows the work space 50.3 provided between top roll 86 and bottom roll 87 of roll form 80. Further development of the pleat is evident and the existance of some freeboard space indicated by the letters F provides further ability to take up for dimensional variations of the strip without cold working edges 50a, 50a' but by working the central portion 50b of strip 50. A "saw-tooth" configuration is provided to working space 50.3 by complimentary meshing of surfaces 86a through 86i on the one hand, and 87a through 87k on the other.

FIG. 10D shows the next step in the sequence and by this time those portions of strip 50 which are to form side walls 28a, 28b are clearly recognizable and are denominated as such. Similarly, the developing scraper rims 32a and 32b are so denominated. Surfaces 96a through 96m compliment surfaces 97a through 97g to define working space 50.4 between them. Note that openings P still exist between the folds which are to form pleats 32a and 32b.

Figure 10E:
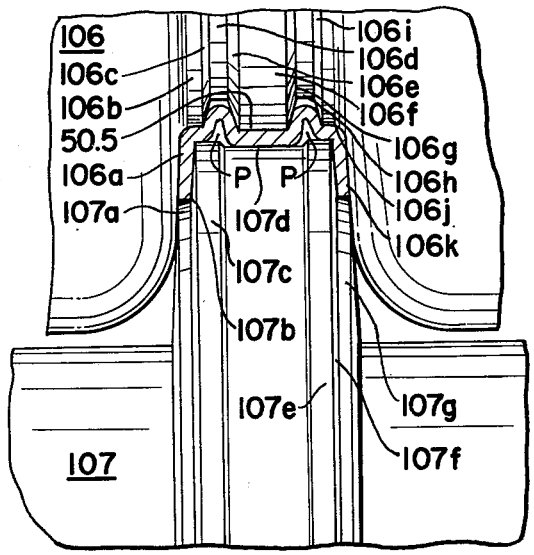

In FIG. 10E working space 50.5 formed between top roll 106 and bottom roll 107 is so conformed that side walls 28a, 28b have assumed their position disposed generally at a right angle to peripheral wall 30. As before, the accordion type action occurring in what was the central portion of strip 50 takes up any dimensional variations in the original stock without necessity to work the edge portions or the side walls 28a, 28b. Surfaces 106a through k compliment surfaces 107a through g to provide a suitable profile to working space 50.5.

Figure 10F:
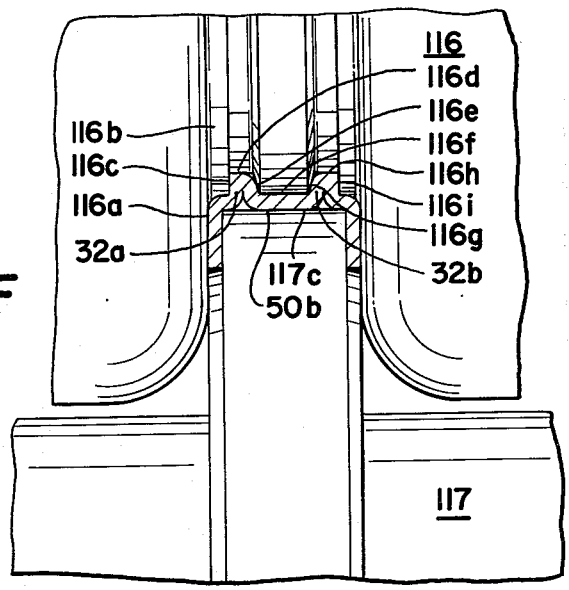

In FIG. 10F, closing of the pleats of scraper rim 32a, between surfaces 116c, 116d, and 116e, and closing of scraper rim 32b between surfaces 116h and 116i; all of which surfaces cooperate with opposing surface 117c in forcing the folds of the pleats 32a, 32b to contact one another, i.e., to close upon one another at least for a substantial distance therealong as indicated by the lines 39a and 39b in FIG. 4.

Figure 10G:
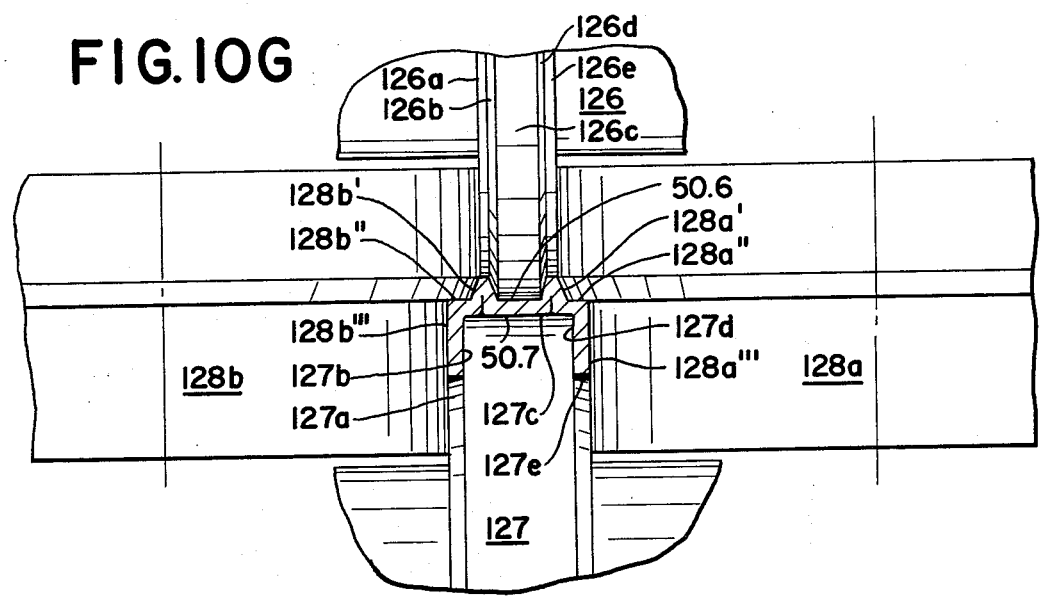

FIG. 10G shows the last roll stand 120 which includes top vertical roll 126, bottom vertical roll 127 and left (as viewed in the drawings) horizontal roll 128b and right horizontal roll 128a.

The profiled surface 126a (or at least the lowermost portions thereof) 126b and the lowermost portion of 126c cooperate with 128a', 128a" and 128a''', surfaces 128b', 128b" and 128b''' and with roller surfaces 127a, 127b, 127c, 127d and 127e to define a metal working space 50.7 within which strip 51 is confined. Metal working space 50.7 is of generally slightly smaller size than in the profile of strip 50.6' emerging from roll stand 110 and entering roll stand 120 so that working space 50.7 has an extrusion like effect which "squeezes down" or extrudes the profile to a slightly smaller dimension than when it entered. This ensures that the finished profile of the strip adheres faithfully to the dimensions of working space 50.7 provided by the various surfaces of rollers 126, 127, 128a and 128b. In this manner, the only tolerance variation to which the strip 50 is subjected as it emerges from roll stand 120 is the variation caused by wear of the rollers 126, 127, 128a and 128b which may, of course, be controlled by replacement, repair and/or readjustment of the rollers as required.

The configuration of the profiled surfaces, for example surfaces 126a and 126e in FIG. 10G is such as to provide a flat scraping face to the rings. The closing of the pleats upon themselves for almost their entire distance, for at least for a very substantial proportion of their entire distance, provides a layered, solid rim which provides structural strength and rigidity to the scraping rings. The dimensional accuracy provided by the rolling method described ensures that the flat scraping faces 34a and 34b are properly aligned relative to side walls 28a and 28b so that they are coplanar and properly coincide with the surface 26 of the cylinder wall in which they are to be employed.

After emerging from roll stand 120, shown in FIG. 7, vent holes as required may be punched in the strip and the strip subjected to other operations such as heat tempering and drying, coiling, severing, etc. as indicated by the block flow diagram of FIG. 6, explained hereinabove.

The rolling method employed it will be noted, bends the strip continuously in one direction without to and fro flexing of the strip portions which, due to the work hardenable nature of the metal employed, such as steel, would be disadvantageous. Repeated flexing and bending tends to work harden the material and make it more difficult to change the profile thereof. Further, it will be noted that the edge portions of the strip are not cold worked or deformed and that the pleating operation and the provision of freeboard in the center of the strip permits taking up variations in the strip dimensions while closely maintaining outwise dimensions without necessity of cold work deformation thereof.

The result is the ability to produce a rolled steel piston ring, particularly a rolled steel oil piston control ring, to dimensional tolerances which are satisfactory to utilize the rings in internal combustion engines without further machining.

Figure 11:
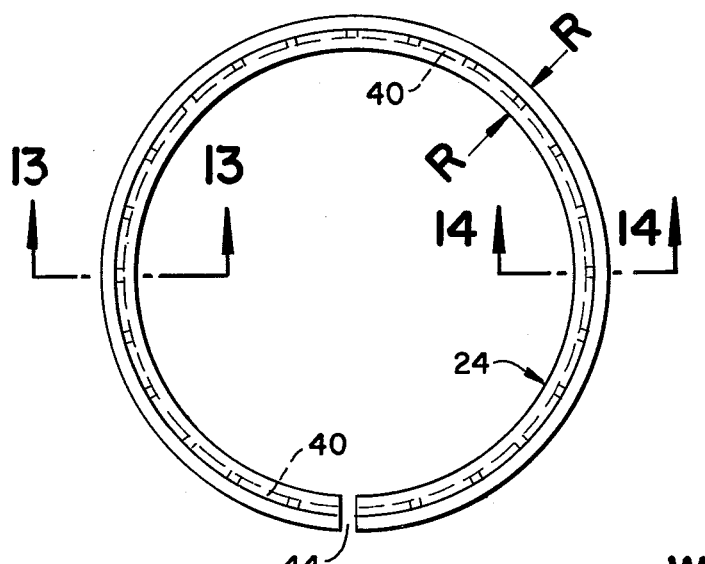
FIG. 11 is a plan view of another embodiment of the piston ring of the invention.
Figure 14:
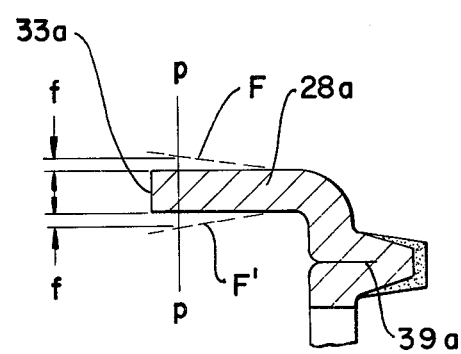
FIG. 14 is an enlarged partial section view along line 14—14 of FIG. 11.

In the embodiments of FIGS. 11–15 parts corresponding to those of the embodiment of FIGS. 3–5 are identically numbered. Thus, an oil control piston ring 24 is generally circular in plan view and has a gap 44 therein. A pair of opposed side walls 28a, 28b project inwardly of ring 24. A pair of scraping rims 32a, 32b project from ring 24, which is provided with vent openings 40 (shown in dotted lines in FIG. 11). Typical dimensions for ring 24 of FIG. 11 are 0.134 inches radial wall thickness (dimension R—R in FIG. 11) and 0.187 inches ring width (dimension W—W in FIG. 11). Ring 24 may be made of a metal strip, for example, a steel strip of 0.0175 to 0.0185 inch thickness (dimension $t$—$t$ in FIGS. 13 and 15). The ring of FIGS. 11–14 may be made, for example, from C-1050 steel which has been given a black oxide surface treatment. Chrome plating 36a, 36b may be applied, for example, by electroplating.

Figure 12:
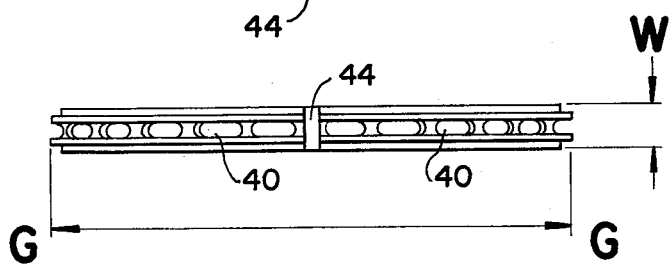
FIG. 12 is a side view of the ring of FIG. 11.

Typical tolerances attainable by production rings produced by the method of the invention are that scraping faces 34a, 34b must show 360° continuous line contact at gauge diameter of the ring (dimension G—G in FIG. 12). The maximum allowable deviation measured from the true gauge diameter is 0.0003 inches. The scraping faces 34a, 34b must also be in 360° alignment with each other to within 0.0004 inches maximum with reference to the cylindrical plane of the ring. Side walls 28a and 28b must not exceed 0.0003 inch maximum deviation about 360° from a flat surface measured circumferentially on surfaces 28a', 28b' (e.g., FIGS. 13 and 15) at a point from 0.010 to 0.020 inches from the inside diameter of the ring, i.e., from end faces 33a, 33b. The small flare (dimensions f—f in FIG. 14) imparted to the ring is held to a maximum of 0.00015 inches over a length of 0.050 inches of the side walls, measured at a point (line p—p in FIG. 14) which is 0.020 inches from the ring inside diameter, i.e., end faces 33a, 33b. An exaggerated portrayal of the position of the surfaces of side wall 28a is shown by F (outward flare) and F' (inward flare).

The extrusion forces imposed on the ring by the process of the invention insure that surfaces, or more properly, interfaces, 39a, 30b formed by the pressed-together portions of peripheral wall 30 provide a ring whose strength, rigidity and durability could not be matched for example, by forming scraping rims 32a, 32b as hollow ridges, as is shown by some of the prior art, even if thereafter the hollow was filled with metal or other material which, in any event, might tend to separate from the ring in use.

FIG. 13 shows a piston ring which may have dimensions as exemplified above with respect to the embodiment of FIG. 11, engaged with an expansion ring 26 similar in shape, but radially proportionately wider, to that shown in FIG. 4, and made of material relatively thicker than the ring. Expansion spring 26 of FIG. 13 may exert an expansion force of 275 psi. No significant outward deflection of sidewalls 28a, 28b is caused thereby.

FIG. 15 shows another embodiment of an expander spring wherein the spring is formed somewhat T-shaped in cross section by having axially projecting knobs 45a and 45b, which engage the piston ring at the edge faces 33a, 33b thereof.

When hard alloy steel such as chromium alloy steels containing sufficient carbon so that a chromium carbide constituent is formed in the alloy of the steel is employed, the necessity of a hard facing alloy such as chromium or molybdenum may be avoided, at least in certain applications. In other applications such as heavy duty diesel engines, the provision of a hard facing such as chromium or molybdenum or any other suitable facing is highly desirable.

While the invention has been described in detail with respect to the specific preferred embdiments thereof it will become apparent upon reading and understanding of the foregoing that numerous alterations and modifications thereto may be made without departing from the scope of the invention. It is intended to include all such modifications and alterations within the scope of the appended claims.

What is claimed is:

1. In a method of forming a piston ring for location in a circumferential groove in a piston movable in a cylinder bore of an internal combustion engine, which piston ring comprises a steel strip of split ring shape and has an intermediate wall portion and a pair of sidewalls extending radially inwardly therefrom and has at its outer periphery a pair of axially spaced cylindrical surfaces for oil scraping engagement with the cylinder bore and which are each located respectively at the outer end of a solid rigid rim which extends radially outwardly with respect to the intermediate wall portion, the steps of providing a strip of steel of uniform width and thickness and which strip has opposite major surfaces and opposite edges, moving said strip linearly through a series of metal forming stations, progressively forming said strip in said stations into a channel-form shape having an intermediate wall portion with sidewall portions extending in one direction therefrom and with a pair of parallel solid rigid rim portions extending in the opposite direction therefrom, each of said solid rigid rims being provided with a flat outer surface at said outer end, coiling the formed steel strip into a helical coil with the sidewall portions extending radially inwardly and the solid rigid rims extending radially outwardly, and slitting said helical coil lengthwise to form individual piston rings.

2. A method as defined in claim 1 further including the steps of forming spaced vent openings in said intermediate wall portion prior to coiling thereof, and hardening said strip by heat treatment.

3. A method as defined in claim 2 further including the steps of surface finishing the piston ring coils and applying a wear resistant coating on the cylindrical surface.

4. A method as defined in claim 3 wherein the step of progressively forming said strip is performed by moving the strip through a series of metal forming rolls which define a series of nips and which act on the strip as it moves therethrough.

5. In a method of forming a piston ring comprising a steel strip of split ring shape and having a pair of sidewalls extending radially outwardly of an intermediate wall and which piston ring has at its outer periphery a pair of axially spaced cylindrical surfaces each located at the outer end of converging radially outwardly extending portions of the strip and which portions have confronting surfaces which abut from the inner apex toward said intermediate wall for at least part of the outward radial extent of said converging portions to provide a pair of axially spaced rigid rims, the steps of providing a strip of steel of uniform width and thickness and which strip has opposite major sufaces and opposite edges, progressively moving said strip through a series of metal forming stations, forming said strip into a channel-form shape having parallel sidewalls extending in one direction with respect to an intermediate wall and a pair of parallel V-shaped projections extending in the opposite direction with respect to the intermediate wall, each V-shaped projection having converging portions, squeezing said converging portions of each of said projections to bring the inner surfaces thereof into abutting engagement by applying forces thereto acting transversely to the direction of movement of the strip to form a pair of transversely spaced rigid rims, and shaping the outer end of the first and second portions to provide a flat outer surface on each of the rigid rims.

6. A method as defined in claim 5 wherein said forming step is performed by progressively moving said strip through a series of metal forming rolls which define a series of nips while at least one roll engages the outer end of the converging portions to shape the outer surface on each of the rigid rims.

7. A method as defined in claim 5 wherein said forming step is performed by moving said strip through a series of metal forming rolls which define a series of nips, and wherein as said strip progresses through said series of rolls the marginal edge portions of said strip are continuously engaged by surfaces on said rolls in each of said nips while said rolls are acting on the opposite major surfaces of said strip.

8. A method as defined in claim 5 further including the steps of coiling said strip into a helical coil by wrapping the strip about a mandrel with the channel opening radially inwardly, heating to set the coil and slitting the coil lengthwise to form individual piston rings.

9. A method as defined in claim 8 wherein said coiled strip is cut into coiled lengths and said coiled lengths are surface finished prior to slitting lengthwise.

10. A method as defined in claim 5 wherein the steel strip is formed by progressively bending said strip continuously in a single direction without flexing adjacent portions of the strip to and fro.

11. A method as defined in claim 10 wherein the sidewalls are formed by progressively bending the edge portions of the steel strip relative to the intermediate portion continuously in a single direction until the sidewalls are at right angles to the intermediate portion.

12. A method as defined in claim 11 wherein a flare is imparted to the sidewalls of the strip in the forming steps which does not exceed 0.00015 inch for a length of 0.050 inch of the sidewalls which begins at a point 0.020 inch from the free edges of the sidewall and extends toward the intermediate wall.

13. A method as defined in claim 5 further including the step of punching vent openings in said intermediate wall prior to coiling said strip.

14. In an apparatus for forming a piston ring for location in a circumferential groove in a piston movable in a cylinder bore of an internal combustion engine, which piston ring comprises a steel strip of split ring shape and having an intermediate wall portion and a pair of sidewalls extending radially inwardly therefrom, said ring having at its outer periphery a pair of cylindrical surfaces for engagement with the cylinder bore and which are located at the outer ends, respectively, of parallel solid rigid rims which extend radially outwardly with respect to the intermediate wall portion, and which apparatus includes means for forming a steel strip into a cross section having an intermediate wall portion and sidewalls extending in one direction therefrom and a pair of rims extending in the other direction therefrom, means for coiling the formed steel strip into a helical coil with the sidewall portions extending radially inwardly and the solid rigid rims extending radially outwardly, means for slitting said helical coil lengthwise to form individual piston rings, means for forming spaced vent openings in said intermediate wall portion prior to coiling said strip into a helical coil, means for hardening said steel strip, and means for surface finishing the piston ring coils, the improvement wherein said means for forming a steel strip comprises means for feeding a strip of steel of uniform width and thickness and which strip has opposite major faces and opposite edges through a series of metal forming stations, means at said stations for progressively bending said strip into a channel-form shape having an intermediate wall portion with sidewall portions extending in one direction therefrom and with a pair of parallel solid rigid rim portions extending in the opposite directon from said intermediate wall, said stations including roll means for deforming out of the intermediate wall portion a pair of parallel V-shaped projections each comprising converging portions having inner and outer faces terminating in and inner apex and an outer end, respectively, and separate roll means for bringing said inner faces into abutment with each other from said inner apex toward said intermediate wall for at least a portion of the distance between said inner apex and said intermediate wall, and roll means at one of said stations for forming flat surfaces at the outer end of each of said V-shaped projections during the progressive formation of said strip.

15. Apparatus as defined in claim 14 wherein said roll means include metal forming rolls configured for progressively bending edge portions of said strip out of the plane of the strip in one direction to form said sidewalls and an intermediate portion while engaging the marginal edges of said strip, and simultaneously bending said converging portions out of the plane of the strip in an opposite direction in the intermediate portion to form said rims and said intermediate wall portion and including metal forming rolls in a succeeding station for squeezing said converging portions into abutting engagement to form said rims into solid, rigid rims while engaging the apex of said converging portions to provide a flat outer surface on the solid rigid rims.

16. Apparatus as defined in claim 15 wherein the metal forming rolls are configured for progressively bending a pair of parallel rims in the same direction each having converging first and second portions and the metal forming rolls in said succeeding station squeeze the first and second portions of each rim into abutting engagement.

17. Apparatus as defined in claim 15 wherein the metal forming rolls are configured for progressively bending said strip in the same direction about each bend line to the final channel-form shape without reverse bending.

* * * * *